United States Patent [19]

Curry et al.

[11] Patent Number: 5,520,461
[45] Date of Patent: May 28, 1996

[54] AIRTIGHT THERMOCOUPLE PROBE

[75] Inventors: Stephen J. Curry, Trumbull; Richard T. Mastanduno, Milford, both of Conn.

[73] Assignee: AlliedSignal Inc., Morris Township, N.J.

[21] Appl. No.: 205,605

[22] Filed: Mar. 2, 1994

[51] Int. Cl.$^6$ .............................. G01K 7/04; G01K 1/10
[52] U.S. Cl. ..................... 374/179; 374/144; 374/208; 136/232
[58] Field of Search ..................... 374/179, 139, 374/140, 144, 208; 136/234, 232; 266/88

[56] References Cited

U.S. PATENT DOCUMENTS

| | | |
|---|---|---|
| 1,773,826 | 8/1930 | Simms . |
| 2,844,637 | 7/1958 | Borel et al. . |
| 3,483,750 | 12/1969 | Pratt . |
| 3,539,400 | 11/1970 | Pustell . |
| 3,643,509 | 2/1972 | Surinx ............................ 374/140 |
| 3,647,559 | 3/1972 | Truppe et al. ................. 374/140 |
| 3,680,382 | 8/1972 | Vaiden ............................ 374/140 |
| 4,060,095 | 11/1977 | Kurita ............................ 136/234 |
| 4,088,509 | 5/1978 | Blaze, Jr. ....................... 136/235 |
| 4,125,738 | 11/1978 | Nichols .......................... 136/234 |
| 4,238,957 | 12/1980 | Bailey et al. . |
| 4,527,909 | 7/1985 | Dale et al. ..................... 374/163 |
| 4,721,533 | 1/1988 | Phillippi et al. ............... 136/234 |
| 4,721,534 | 1/1988 | Phillippi et al. ............... 136/234 |
| 4,856,462 | 9/1989 | Broomfield .................... 374/179 |
| 4,871,263 | 10/1989 | Wilson ........................... 374/139 |
| 4,977,001 | 12/1990 | Greenspan ..................... 374/208 |
| 4,984,904 | 1/1991 | Nakano et al. ................ 374/140 |
| 4,989,992 | 2/1991 | Piai ................................ 374/141 |
| 5,071,258 | 12/1991 | Usher et al. ................... 374/140 |
| 5,209,571 | 5/1993 | Kendall ......................... 374/208 |
| 5,388,908 | 2/1995 | Kendall ......................... 374/140 |

FOREIGN PATENT DOCUMENTS

| | | | |
|---|---|---|---|
| 0586343 | 12/1977 | U.S.S.R. ........................ | 374/140 |
| 0007910 | of 1908 | United Kingdom ........... | 374/140 |
| 1243028 | 8/1971 | United Kingdom ........... | 374/140 |

*Primary Examiner*—Diego F. F. Gutierrez
*Attorney, Agent, or Firm*—James W. McFarland

[57] ABSTRACT

A metallic thermocouple probe is capable of withstanding temperatures in excess of 1650° C. in oxidizing environments. First and second electrically conductive leads of dissimilar metals are joined at an extreme sensing end and extend to a distant readout device. Metal oxide insulation such as beryllium oxide, magnesium oxide, and aluminum oxide, electrically isolates the conductive leads and thermally isolates them from the environment. The extreme sensing end of the thermocouple probe is encapsulated to render it impermeable to the formation of oxides thereon. This encapsulation includes a protective coating composed of a non-porous ceramic material, preferably a cementation applied disilicide. Additionally, a high temperature structural sheath overlies the insulation adjacent the extreme sensing end and a low temperature sheath overlies the insulation adjacent the first sheath distant from the extreme sensing end. The first and second sheaths abut at a sheath junction and a splice cover overlies the sheath junction and is attached to the first and second sheaths. The first sheath is composed of a refractory metal such as tungsten, tantalum, molybdenum, columbium-zirconium, or their alloys; the second sheath is composed of a material such as stainless steel, INCONEL brand alloys, or glass woven into an overbraid; and the splice cover is composed of a metal such as stainless steel or inconel.

21 Claims, 3 Drawing Sheets

AIRTIGHT THERMOCOUPLE PROBE

BACKGROUND OF THE INVENTION

1. Field of the Invention

The present invention relates generally to elevated temperature measuring apparatus and, more particularly, to such apparatus including a metallic thermocouple probe capable of withstanding temperatures in excess of 1650° C.

Although the technology of refractory metal thermocouple probes has been well known for many years, the devices were not suitable for use in oxidizing environments due to rapid oxidation of sheath and thermocouple materials. The addition of a gas tight ceramic covering enveloping the thermocouple overcomes this limitations and allows use of such probes in an oxidizing environment such as within an operating gas turbine engine.

2. Background of the Invention

Thermocouple probes made of refractory metals such as tungsten and molybdenum have been used at temperatures up to 2315° C. since the 1950s. The major problem with such probes was extremely rapid oxidation (occurring within minutes) of probes subjected to temperatures above 1200° C. in the presence of any amount of oxygen in the surrounding environment. Therefore the probes were used only in applications where oxygen was not present, as in glass making, or was specifically excluded, as in certain foundry operations.

All manufacturers of refractory metal thermocouple probes state in their literature relating to that product line that the probes may be used at temperatures up to 2315° C., but in every instance add the qualification that this capability never applies in oxidizing environments, even for short periods of time.

There have been attempts to "flame spray" ceramic coatings on sheaths, but the objective was to lower the temperature of the sheath. In these instances, the coatings were porous and were not designed to exclude oxygen.

A patent which is typical of the prior art is U.S. Pat. No. 4,977,001 to Greenspan which discloses a cladding for a molybdenum body such as a molybdenum tube intended to protect the molybdenum from corrosive high temperature environments. The cladding contains specified percentages by weight of molybdenum, aluminum, silicon, and alkali metals. While a process of manufacture is disclosed calling for formation of the cladding by bringing the molybdenum body into contact in the presence of oxygen with a refractory containing oxides of aluminum, silicon, and alkali metals at a temperature greater than 400° C. there is no mention of the operating temperature for the molybdenum, although the specification acknowledges that temperatures greater than about 1700° C. may cause a breakdown of the components in the protective cladding.

U.S. Pat. No. 4,989,992 to Piai discloses a probe equipped with a sensitive thermocouple element in contact with material to be measured, the thermocouple element being connected to electronic circuitry, distantly located, for amplifying and processing temperature signals and for displaying, recording, and controlling those signals. The probe comprises a sensitive thermocouple element constituted of two metallic wires having different thermoelectrical characteristics connected together at one end by a weld, the wires being embedded in a protective covering envelope of electrically and thermally insulating ceramic material, the weld between the wires being at a very short distance from the front surface of the envelope. Preferably, the wires of the sensitive element are constituted, respectively, of platinum and of platinum-rhodium with their ends welded together to form a hot junction of the thermoelectric couple. A temperature range mentioned in the patent for the measuring device therein disclosed is between approximately 20° C. and 250° C. This temperature range is far lower than that intended for the present invention and there is no mention nor apparent concern for protection of the thermocouple probe from oxidation.

A number of patents disclosing thermocouples with protective sheaths, although not airtight sheaths, are U.S. Pat. Nos. 4,871,263 to Wilson, 4,865,462 to Broomfield, and 4,721,534 to Phillippi et al.

It was in light of the foregoing state of the art that the present invention has been conceived and is now reduced to practice.

SUMMARY OF THE INVENTION

The present invention relates to a metallic thermocouple probe which is capable of withstanding temperatures in excess of 1650° C. in oxidizing environments. First and second electrically conductive leads of dissimilar metals are joined at an extreme sensing end and extend to a distant readout device. Metal oxide insulation such as beryllium oxide, magnesium oxide, and aluminum oxide electrically isolates the conductive leads and thermally isolates them from the environment. The extreme sensing end of the thermocouple probe is encapsulated to render it impermeable to the formation of oxides thereon. This encapsulation includes a protective coating composed of a non-porous ceramic material, preferably a cementation applied disilicide. Additionally, a high temperature structural sheath overlies the insulation adjacent the extreme sensing end and a low temperature sheath overlies the insulation adjacent the first sheath distant from the extreme sensing end. The first and second sheaths abut at a sheath junction and a splice cover overlies the sheath junction and is attached to the first and second sheaths. The first sheath is composed of a refractory metal such as tungsten, tantalum, molybdenum, columbium-zirconium, or their alloys; the second sheath is composed of a material such as stainless steel, INCONEL brand alloys manufactured by Inco Alloys International, Inc., or glass woven into an overbraid; and the splice cover is composed of a metal such as stainless steel or Inconel. In another embodiment, encapsulation is provided by means of a protective ceramic casing such as aluminum oxide spaced from the first and second sheaths to define a cavity containing an inert gas.

Accordingly, a primary object of the present invention is to provide elevated temperature measuring apparatus which is capable of withstanding temperatures in excess of 1650° C. for use in oxidizing environments.

Another object of the invention is to provide such apparatus which includes a thermocouple probe encapsulated to render it substantially impermeable to prevent the formation of oxides thereon.

A further object of the invention is to provide such apparatus wherein the encapsulation includes a protective coating proximate the sensing end of the thermocouple probe composed of a non-porous ceramic material.

Still another object of the invention is to provide such apparatus in which insulation for electrically isolating the electrically conductive leads of the thermocouple probe from one another and for thermally isolating the electrically conductive leads from heat external of the probe is a metal oxide selected from a group consisting of beryllium oxide, magnesium oxide, and aluminum oxide.

Still a further object of the invention is to provide such apparatus which includes a first high temperature structural sheath overlying the insulation adjacent the extreme sensing end, a low temperature sheath adjacent a first sheath and overlying the insulation distant from the extreme sensing end, the two sheaths abutting at a sheath junction, and a splice cover overlying the sheath junction and attached to the first and second sheaths.

Yet a further object of the invention is to provide such apparatus in which the first sheath is composed of refractory metal selected from the group consisting of tungsten, tantalum, molybdenum, columbium-zirconium, and alloys thereof, wherein the second sheath is composed of a material selected from a group consisting of stainless steel, Inconel, and glass woven into an overbraid, and wherein the splice cover is composed of a metal selected from a group consisting of stainless steel and INCONEL brand alloys.

Yet another object of the invention is to provide such temperature measuring apparatus in which the encapsulation includes a protective ceramic casing for reception therein of a thermocouple probe and gastight sealant means distant from the extreme sensing end of the probe for enclosing the sensing end of the probe within the ceramic casing.

Another object of the invention is to provide such apparatus in which an inert gas is received in a cavity between the probe and the ceramic casing.

Other and further features, advantages, and benefits of the invention will become apparent in the following description taken in conjunction with the following drawings. It is to be understood that the foregoing general description and the following detail description are exemplary and explanatory but are not to be restrictive of the invention. The accompanying drawings which are incorporated in and constitute a part of the invention illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENTS

Figure 1:
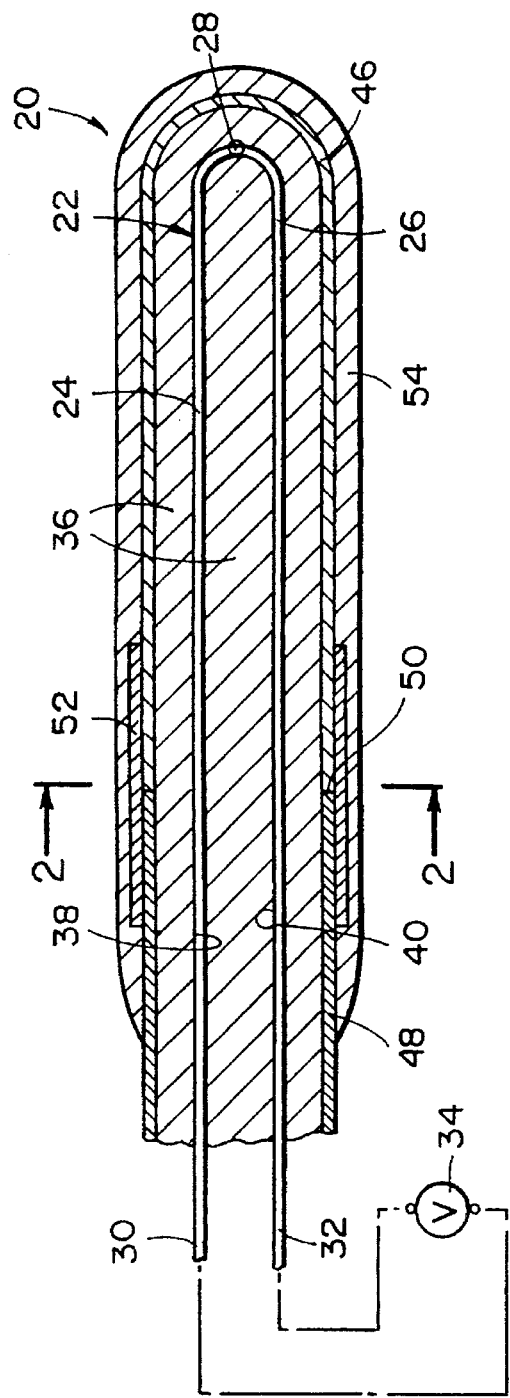
FIG. 1 is a detail diagrammatic view, substantially in section, illustrating a preferred embodiment of elevated temperature measuring apparatus of the invention.
Figure 2:
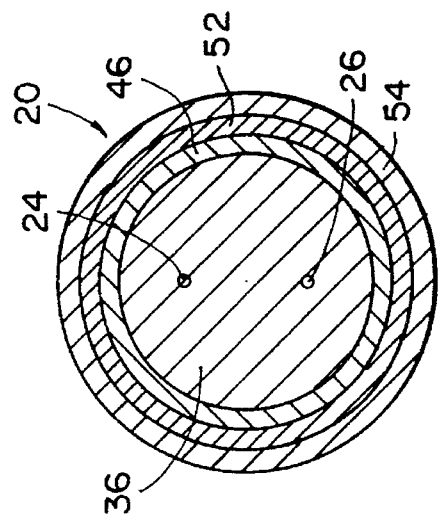
FIG. 2 is a cross section view taken generally along line 2—2 in FIG. 1.

Turn now to the drawings and, initially, to FIGS. 1 and 2 which illustrate one embodiment of the present invention. According to the invention, elevated temperature measuring apparatus 20 is illustrated which is capable of withstanding temperatures in excess of 1650° C. while subjected to an oxidizing environment. A metallic thermocouple probe 22 includes a pair of electrically conductive leads 24, 26 of dissimilar metals which are joined in a known manner at an extreme sensing end 28 and extend via a pair of terminal leads 30, 32, respectively, to voltmeter 34 or other suitable readout device. Typical materials for the electrical leads 24, 26 may be, for example, 95% tungsten, 5% rhenium (+) vs. 74% tungsten, 26% rhenium(−) or, in another instance, 97% tungsten, 3% rhenium(+) vs. 75% tungsten, 25% rhenium(−). It will be understood that these are merely examples of typical materials for the thermocouple leads and that the invention is not to be limited to these specific examples.

Insulating material 36 is provided for electrically isolating the electrical leads 24, 26 from one another and for thermally isolating those leads from heat external of the probe 22. The insulating material 36 is preferably a metal oxide and, more specifically, a metal oxide selected from the group consisting of beryllium oxide, magnesium oxide, and aluminum oxide. In one instance, the insulating material 36 may be an elongated solid block having a pair of longitudinally extending substantially parallel bores 38, 40 for the reception therein of the electrical leads 24, 26. At the extreme right hand end of the apparatus 20 as illustrated in FIG. 1, insulating material 36 ends prior to the extreme right end to allow formation of the extreme sensing end, usually referred to as junction 28. The space between the end of the insulating material 36 and the end of the sheath 46 may be evacuated, filled with inert gas or filled with suitable insulating material. Tip ends of the electrical leads 24, 26 are joined as by welding to form the extreme sensing end 28. In another embodiment of the invention, the insulating material may be comprised of a mass of powder into which the electrical leads 24, 26 are suitably embedded.

The electrical leeds 24, 26 may be continuous to the readout device 34 or spliced to suitable material terminal leads 30, 32 for ease in handling or other reasons at a convenient location distant from sensing end. The same may be true for insulation 36.

Figure 3:
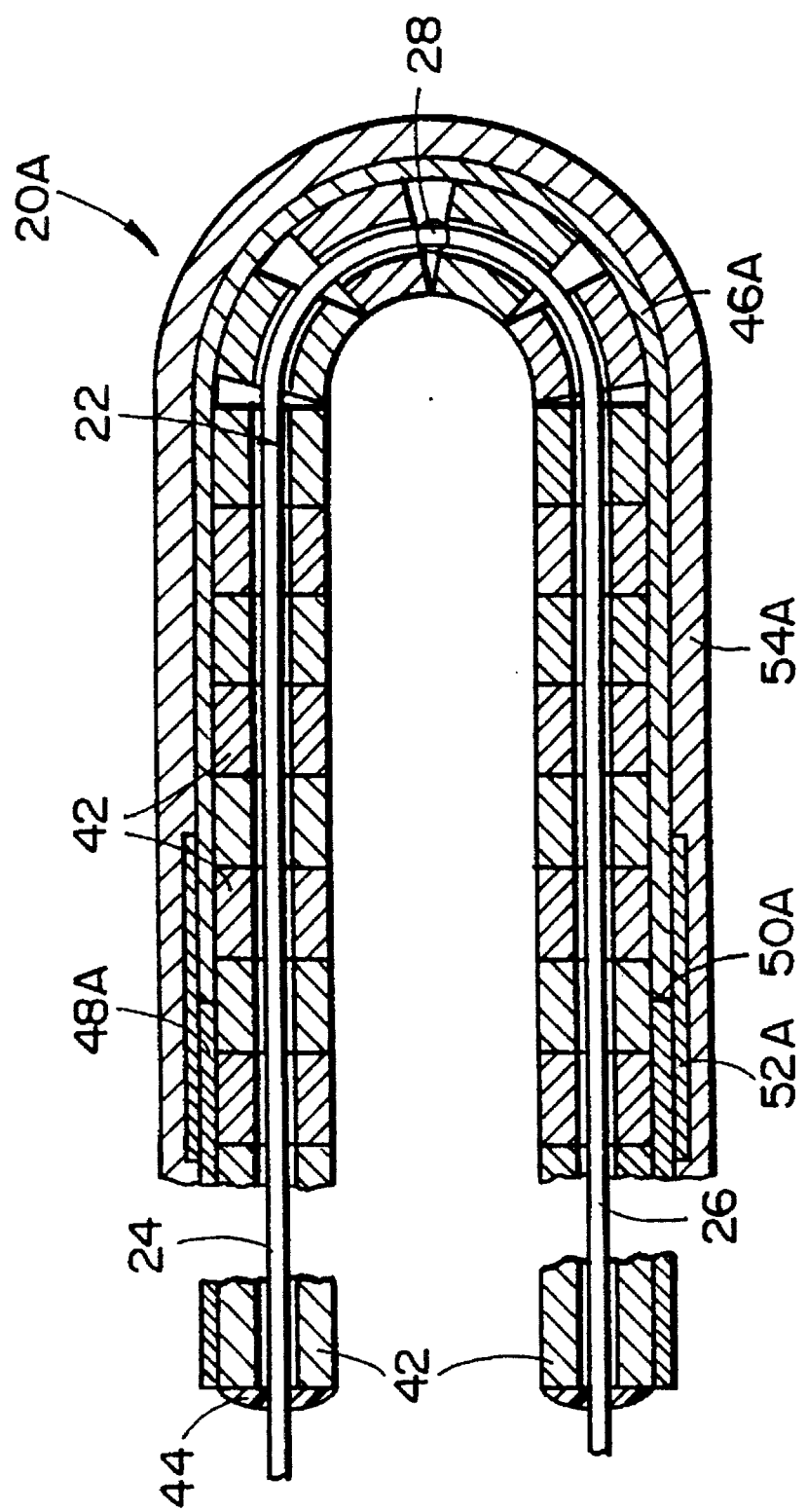
FIG. 3 is a detail elevation diagrammatic view, in section, similar to FIG. 1, illustrating another embodiment of the invention.

In another embodiment of the invention, as illustrated in FIG. 3, modified elevated temperature measuring apparatus 20A includes a plurality of apertured beads 42 which are slidably received in side by side relationship on the electrical leads 24, 26 for the entire length thereof so as to substantially envelop the electrical leads. At a location distant from the extreme sensing end 28 of the thermocouple probe 22, suitable sealant 44 may be applied to each extreme apertured bead 42 distant from the extreme sensing end 28. In this manner, a continuous cavity defined by the opposing surfaces of the apertures in the beads 22 and of their associated electrical leads 24, 26 is thereby defined and terminated. It may be desirable to introduce in some suitable manner a suitable quantity of inert gas such as argon to further protect the thermocouple probe 22 against oxidation which would otherwise become excessive at the elevated temperatures to which the probe 22 may be subjected.

Returning to FIGS. 1 and 2, a high temperature structural sheath 46 is applied to the outer surfaces of the insulating material 36 to provide mechanical strength to the combination of the thermocouple leads 24, 26 and insulating material 36 at the elevated temperatures to which the apparatus 20 is intended to be subjected. However not only is the apparatus 20 intended to be subjected to high temperatures, but a primary objective of the invention is for the apparatus 20 to be utilized for sensing temperatures within a gas turbine engine in which it is customary for very hot gases including some portion of oxygen to flow at a high velocity, for example, at speeds in the range of approximately 100 to 200 feet per second. For this purpose, it is typical to use refractory metals such as tungsten, tantalum, molybdenum, and columbium-zirconium. As noted earlier, the high temperature sheath 46 overlies the insulating material 36 adjacent the extreme sensing ends 28 where the temperatures may exceed 1650° C.

At a location distant from the extreme sensing end 28, a low temperature sheath 48 overlying the insulating material 36 is preferably employed which is sized similar to the sheath 46 in diameter and abuts the sheath 46 at a sheath junction 50. The low temperature sheath 48 may be a metal such as stainless steel or INCONEL brand alloys or it may be a glass woven into an overbraid. The purposes for the low temperature sheath 48 include ease of handling, lower cost, and containment of the insulating material 36 at locations distant from the extreme sensing end 28 whereas the purpose for the high temperature sheath 46 is to provide mechanical strength to the electrical leads 24, 26 at high temperature and in the presence of a high velocity hot gases to which the apparatus 20 is to be subjected.

The sheaths 46, 48 abut at a sheath junction 50 which is continuous around the periphery of the insulating material 36. In order to prevent any discontinuity in the structure described thus far, a splice cover 52 is provided which is annular shaped and encompasses the sheaths 46, 48 and overlies the sheath junction 50. The splice cover 52 is typically of stainless steel or INCONEL brand alloys and is preferably brazed to the high temperature sheath 46 as well as to the low temperature sheath 48 when the latter is a metal. However, when the latter is a non-metal, such as glass, a suitable bonding material is utilized, perhaps for attachment to both sheaths 46, 48.

Finally, a protective coating 54 is suitably applied to the outer surfaces of the high temperature sheath 46, the Splice cover 52, and to the low temperature sheath 48 for a substantial distance from the sheath junction 50 extending in a direction away from the extreme sensing end 48. The protective coating 54 is a substantially non-porous ceramic material which encapsulates the high temperature sheath 46 in the region of the sensing end 28. A preferable material for this purpose is a cementation applied disilicide having a thickness in the range of approximately 0.001 inches to 0.004 inches. One such material is DURAK B brand sold by ARi Industries, Inc. of Addison, Ill. One method of applying the protective coating 54 is by spraying.

The same construction as described with reference to FIGS. 1 and 2 would be utilized in the embodiment of FIG. 3. However, in FIG. 3, the various similar layers or components are represented by the same numbers but with the letter "A" as a suffix.

When considering the protective coating 54, it is necessary to define the term "non-porous". The term "non-porous" is most appropriately defined in terms of the operating environment to which the apparatus 20 is subjected. More specifically, "non-porous" means that in the course of a typical test time at typical test pressures and temperatures, there is no failure of the apparatus 20, where: (1) typical test times are between approximately 10 and 100 hours; (2) typical test pressures are defined as the difference between the total pressure outside the apparatus 20 and the static pressure inside the apparatus 20, where typical outside pressure is less than approximately 300 psi and typical inside pressure is between approximately 0 psi (vacuum) and 15 psi; (3) typical test temperatures range from approximately 1100° C. to the maximum useful temperature for the apparatus 20 of approximately 2000° C.; and (4) failure of the apparatus 20 is defined as oxidation of the sheath 46 or leads 30, 32 to the point at which the sheath loses sufficient structural integrity to withstand stress caused by external flow or the wires lose electrical continuity, whichever occurs first.

In a given instance, it may be desired to determine the failure mode, for example, of a probe 22 having a 3 mm diameter and a 0.1 mm thick sheath 46. In this instance, the maximum permissible leakage rate through the protection coating 54 would be calculated so that a sufficiently small number of oxygen molecules would pass through the protective coating under test or operating conditions to assure that the sheath 46 would oxidize (combine with) less than 10% of the available sheath material. Such specified test or operating conditions may be as follows:

Test time: 10 hours

Test temperature: 1650° C.

Test pressure outside probe: 300 psi

Test pressure inside probe: 0 psi (vacuum)

The thickness of the protective coating 54 would then be calculated to assure a leakage rate less than the maximum permissible value as determined above.

Figure 4:
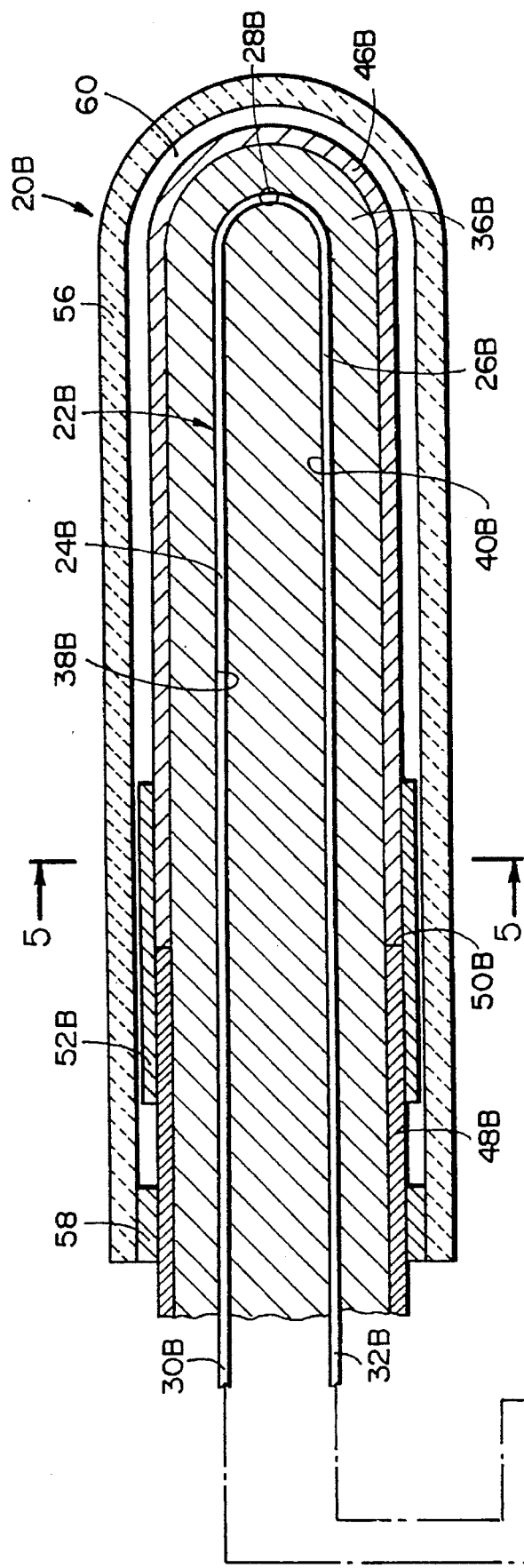
FIG. 4 is a detail elevation diagrammatic view, similar to FIG. 1, illustrating still another embodiment of the invention.
Figure 5:
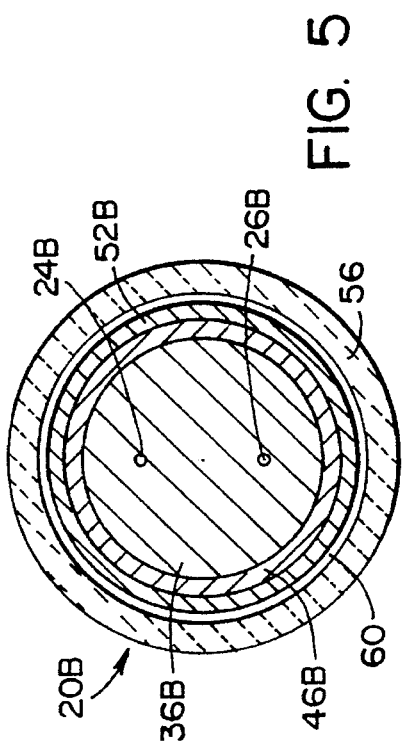
FIG. 5 is a cross section view taken generally along line 5—5 in FIG. 4.

Another embodiment of the invention is illustrated in FIGS. 4 and 5 in which all components similar to those described with regard to FIGS. 1 and 2 are similarly numbered but with a suffix "B". Hence, a novel elevated temperature measuring apparatus 20B is illustrated in which structure for encapsulating a thermocouple probe 22B includes a protective ceramic casing 56 which encompasses and encapsulates the thermocouple probe 22B and extends rearwardly a substantial distance from the extreme sensing end 28B, A suitable material for the casing 56 may be Omegatite 450 sold by Omega Corp. of Stamford, Conn. Distant from the extreme sensing end 28B, a suitable sealant 58 is applied for attachment both to the outer peripheral surface of the sheath 48B and to the interior peripheral surface of the ceramic casing 56. Such a suitable sealant may be Epoxylite 813-9, sold by Epoxylite Corp. of Irvine, Calif., or other equivalent material. A cavity 60 is thereby defined intermediate the ceramic casing 56 and the first and second sheaths 46B, 48B. This cavity may be evacuated or, preferably, filled with an inert gas such as argon.

By reason of the embodiments disclosed, the goal of the invention has been achieved, namely, to specifically exclude oxygen from the high temperature sheath and not to lower its temperature. A primary difference between the present invention and the prior art stems from the fact that in the latter, at very high temperatures, oxygen is usually not present, having been exhausted from combustion or having been specifically removed for other purposes. In the present instance, however, high temperatures are intended to be measured where oxygen is present, sometimes even specifically injected for purposes of cooling. Thus, in the past, most of the refractory metal thermocouple probe development has been aimed at oxygen-absent applications at the highest temperatures. However, the present invention is aimed at obtaining temperature measurements at high and also lower temperatures at which oxygen is always present.

It is noteworthy that at engine temperatures above 1650° C., the temperature range at which the present invention is intended, the life expectancy of expensive platinum probes is short, dropping to near zero at platinum's 1775° C. melting point, approximately 225° C. lower than the approximate limit of the present invention. By the reason of the invention's higher maximum temperature limit and much lower cost, the lifetime of such probes is greatly extended and, therefore, enhanced.

Having thus described the invention, the following example which is a documented test is offered to illustrate it in more detail:

EXAMPLE

Two prototype probes were produced for evaluation in a high temperature turbine research rig. Since a major problem with using metals such as tungsten and rhenium at high temperatures is extremely low oxidation resistance, two methods of excluding oxygen from the thermocouple were tried. One was a cementation applied disilicide coating covering a molybdenum sheath, and the other was an ultrapure (99.8%) aluminum oxide solid sheath around a slender molybdenum probe.

A test rig was fabricated using an oxyacetylene torch pointed at a probe clamped in a ring stand. A platinum alloy thermocouple was used to check probe output up to 1650° C. the maximum usable temperature for such probes. The temperature versus voltage curve generated at the lower temperatures was used to calculate probe tip temperatures as the flame was increased.

The platinum probe was then withdrawn and the probes were kept at a constant output for 15 minutes. The flame setting was gradually increased until failure. Using this method, the temperatures indicated in this test were all in excess of 1927° C. where the alumina sheathed probe began to display erratic output and then melted. The coated probe lasted approximately 30 minutes longer, with a maximum indicated temperature of over 2200° C.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Elevated temperature measuring apparatus capable of withstanding temperatures in excess of 1650° C. for use in oxidizing environments comprising:

a metallic thermocouple probe including first and second electrically conductive leads of dissimilar metals joined at an extreme sensing end and extending from said extreme sensing end to readout means distant therefrom;

insulating means for electrically isolating said first and second electrically conductive leads from one another and for thermally isolating said first and second electrically conductive leads from heat external of said probe;

structural sheath means for receiving said thermocouple probe and said insulating means and for providing mechanical strength to said thermocouple probe and said insulating means, said sheath means having an open end and a closed end, said extreme sensing end of said thermocouple probe located proximate said closed end; and encapsulating means enveloping said thermocouple probe, said insulating means, and said sheath means adjacent said extreme sensing end for providing a substantially oxygen impermeable barrier to prevent oxygen contained in said oxidizing environment from contacting said thermocouple probe, said insulating means, and said sheath means, and thereby render said thermocouple probe impermeable to the formation of oxides thereon which would render it inoperable.

2. Elevated temperature measuring apparatus as set forth in claim 1 wherein said encapsulating means includes: a protective coating proximate said sensing end of said thermocouple probe composed of a non-porous ceramic material capable of preventing oxidation of more than approximately 10% of said sheath means.

3. Elevated temperature measuring apparatus as set forth in claim 2 wherein said protective coating is a cementation applied disilicide having a thickness in the range of approximately 0.001 inches to 0.004 inches.

4. Elevated temperature measuring apparatus as set forth in claim 1 including:

wherein said insulating means includes an elongated solid block composed of a metal oxide and having a pair of longitudinally extending substantially parallel bores therethrough for receiving therein said first and second electrically conductive leads.

5. Elevated temperature measuring apparatus as set forth in claim 1 wherein said insulating means includes powder material composed of a metal oxide, said first and second electrically conductive leads being embedded therein.

6. Elevated temperature measuring apparatus as set forth in claim 1 wherein said insulating means includes a plurality of apertured beads composed of a metal oxide slidably received in side by side relationship on said first and second electrically conductive leads thereby substantially enveloping said conductive leads.

7. Elevated temperature measuring apparatus as set forth in claim 1 wherein said insulating means is a metal oxide.

8. Elevated temperature measuring apparatus as set forth in claim 1 wherein said insulating means is a metal oxide selected from the group consisting of beryllium oxide, magnesium oxide, and aluminum oxide.

9. Elevated temperature measuring apparatus as set forth in claim 1 wherein said structural sheath means includes:

a first high temperature portion overlying said insulating means adjacent said extreme sensing end;

a second low temperature portion adjacent said first portion and overlying said insulating means distant from said sensing end, said first and second portions abutting at a sheath junction; and splice cover means overlying said sheath junction attached to said first and second portions.

10. Elevated temperature measuring apparatus as set forth in claim 9 including:

bonding means for attaching said splice cover means to said first and second portions.

11. Elevated temperature measuring apparatus as set forth in claim 9 wherein said first portion of said sheath means is composed of a refractory metal selected from the group consisting of tungsten, tantalum, molybdenum, columbium-zirconium, and alloys thereof;

wherein said second portion of said sheath means is composed of a material selected from the group consisting of stainless steel, inconel, and glass woven into an overbraid; and wherein said splice cover means is composed of a metal selected from the group consisting of stainless steel and inconel.

12. Elevated temperature measuring apparatus as set forth in claim 1
   wherein said encapsulating means includes a protective ceramic casing for reception therein of said thermocouple probe; and
   sealant means distant from said extreme sensing end for sealingly enclosing said sensing end of said thermocouple probe within said ceramic casing.

13. Elevated temperature measuring apparatus as set forth in claim 12
   wherein said encapsulating means is composed of a metal oxide.

14. Elevated temperature measuring apparatus as set forth in claim 12
   wherein said encapsulating means includes aluminum oxide.

15. Elevated temperature measuring apparatus as set forth in claim 12
   wherein said insulating means is a metal oxide.

16. Elevated temperature measuring apparatus as set forth in claim 12
   wherein said insulating means is a metal oxide selected from the group consisting of beryllium oxide, magnesium oxide, and aluminum oxide.

17. Elevated temperature measuring apparatus as set forth in claim 16 wherein said structural sheath means includes:
   a first high temperature portion overlying said insulating means adjacent said extreme sensing end;
   a second low temperature portion adjacent said first portion and overlying said insulating means distant from said sensing end, said first and second portions abutting at a sheath junction; and
   splice cover means overlying said sheath junction attached to said first and second portions.

18. Elevated temperature measuring apparatus as set forth in claim 17
   wherein said first portion of said sheath means is composed of a refractory metal selected from the group consisting of tungsten, tantalum, molybdenum, columbium-zirconium, and alloys thereof;
   wherein said second portion of said sheath means is composed of a material selected from the group consisting of stainless steel, inconel, and glass woven into an overbraid; and
   wherein said splice cover means is composed of a metal selected from the group consisting of stainless steel and inconel.

19. Elevated temperature measuring apparatus as set forth in claim 17
   wherein said sealant means is attached to said encapsulating means and to said second portion and defines a cavity intermediate said ceramic casing and said first and second portions; and
   wherein the cavity contains an inert gas.

20. Elevated temperature measuring apparatus as set forth in claim 16 including:
   bonding means for attaching said splice cover means to said first and second portions.

21. Elevated temperature measuring apparatus as set forth in claim 1
   wherein said encapsulating means includes:
   a protective coating proximate said sensing end of said thermocouple probe composed of a non-porous ceramic material capable of preventing oxidation of more than approximately 10% of said sheath means when said apparatus is subjected to temperatures in the range of approximately 1100° C. to 2000° C., at external pressures less than approximately 300 psi, internal pressures between approximately 0 psi and 15 psi, and for a duration between approximately 10 and 100 hours.

* * * * *